United States Patent
Christinger

[11] Patent Number: 5,764,757
[45] Date of Patent: Jun. 9, 1998

[54] OPERATOR POSITION AND METHOD FOR REMOTE-CONTROLLING A SPEECH CONNECTION

[75] Inventor: Hansjörg Christinger, Pfäffikon, Switzerland

[73] Assignee: Alcatel N.V., Rijswijk, Netherlands

[21] Appl. No.: 558,899

[22] Filed: Nov. 16, 1995

[30] Foreign Application Priority Data

Nov. 17, 1994 [CH] Switzerland ................ 3453/94

[51] Int. Cl.$^6$ .................................. H04M 3/60
[52] U.S. Cl. ............ 379/267; 379/102.01; 379/102.02; 379/260
[58] Field of Search ................ 379/267, 212, 379/211, 210, 201, 265, 266, 218, 223, 260, 102.01, 102.02, 93.01

[56] References Cited

U.S. PATENT DOCUMENTS

| | | | |
|---|---|---|---|
| 4,620,066 | 10/1986 | Bushnell et al. | 379/113 |
| 4,916,726 | 4/1990 | Morley, Jr. et al. | 379/218 |
| 5,001,710 | 3/1991 | Gawrys et al. | 379/142 |
| 5,008,930 | 4/1991 | Gawrys et al. | 379/210 |
| 5,012,512 | 4/1991 | Basso et al. | 379/218 |
| 5,097,528 | 3/1992 | Gursahaney et al. | 379/267 |
| 5,157,718 | 10/1992 | Kaplan et al. | 379/218 |
| 5,210,789 | 5/1993 | Jeffus et al. | 379/267 |
| 5,276,732 | 1/1994 | Stent et al. | 379/93 |
| 5,309,504 | 5/1994 | Morganstein | 379/218 |
| 5,347,646 | 9/1994 | Hirosawa et al. | 379/102.01 |
| 5,396,536 | 3/1995 | Yudkowsky | 379/52 |
| 5,442,693 | 8/1995 | Hays et al. | 379/218 |
| 5,555,299 | 9/1996 | Maloney et al. | 379/212 |

FOREIGN PATENT DOCUMENTS

| | | |
|---|---|---|
| 0177218 | 4/1986 | European Pat. Off. |
| 0576205 | 12/1993 | European Pat. Off. |
| 9304550 | 4/1993 | WIPO |

OTHER PUBLICATIONS

"ISDN Attendant Console", J. Jaggernauth et al, ICC '86, Session 39, Paper 8, vol. 2, Jun. 22, 1986, Toronto, Canada, pp. 39.8.1–29.8.3.

Patent Abstracts of Japan, vol. 10, No. 201 (E–419), Jul. 15, 1986, and Japanese Patent No. 61043057 dtd. Mar. 1, 1986.

*Primary Examiner*—Ahmad F. Matar
*Assistant Examiner*—Scott Wolinsky
*Attorney, Agent, or Firm*—Ware, Fressola, Van Der Sluys & Adolphson LLP

[57] ABSTRACT

Telephone calls passed from an operator service exchange (3) on to a local operator position (1) are received at the latter and information is issued to the caller. The principle components of the position (1) are (A) a connection (6) to the position desk controller (4) of the operator service exchange (3), (B) a speech connection from the position desk controller which terminates in a headset, and (C) a local personal computer (5) which, on the one hand, produces a display and controls the speech connection and, on the other hand, provides access to the required information. This position (1) is operated remotely, in that the local personal computer (5) is remote-controlled by a remote personal computer (8) through an ISDN telephone connection and in that, at the same time, the speech connection is extended from the position desk controller (4) through the local personal computer (5) and a telephone network to a remote operator position (2). In a preferred embodiment, the speech connection is passed through the ISDN telephone connection and also routed to the remote position (2) through the computer (8), so that the speech connection can be dealt with from the remote computer (8) alone.

9 Claims, 1 Drawing Sheet

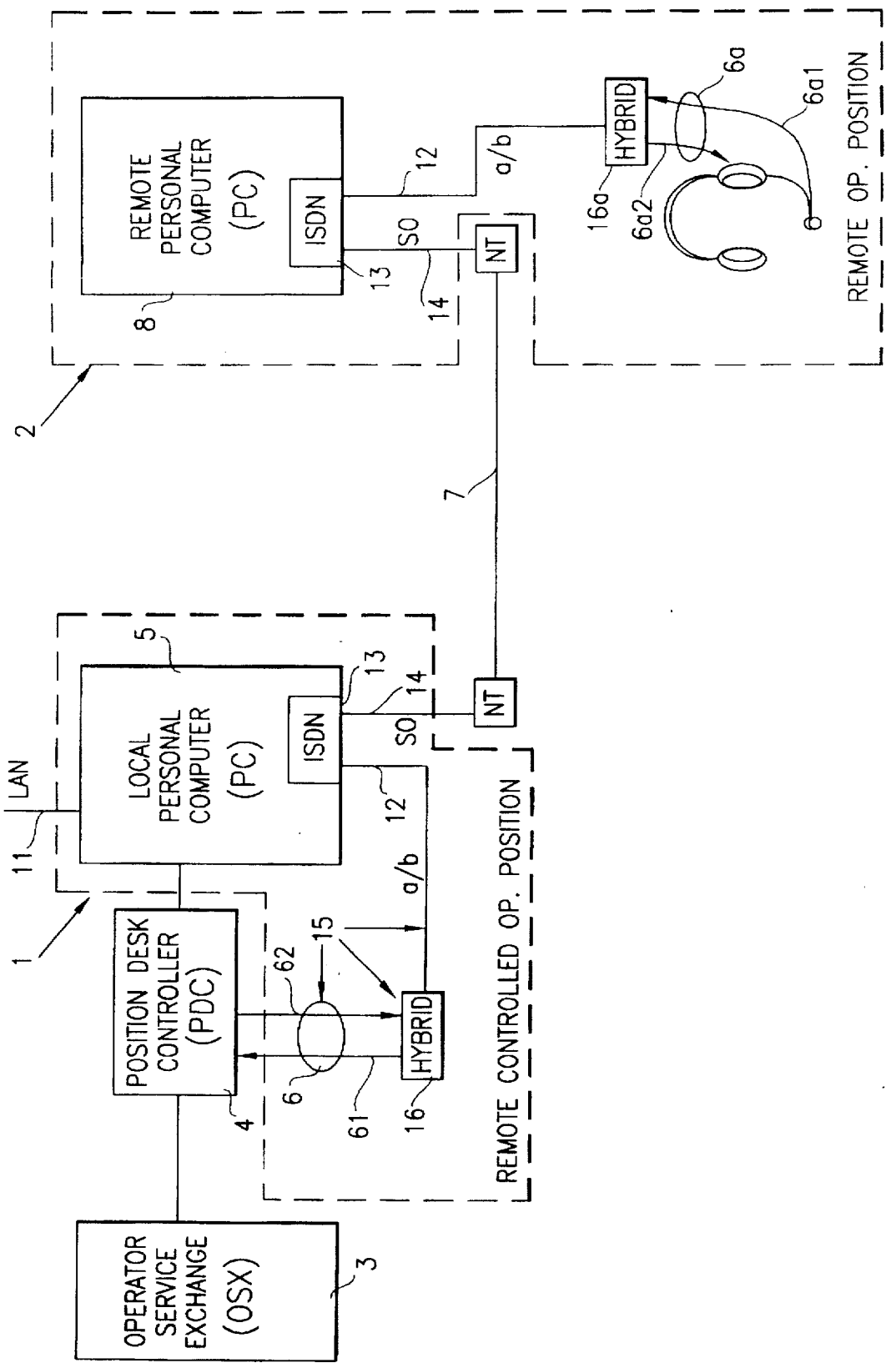

5,764,757

OPERATOR POSITION AND METHOD FOR REMOTE-CONTROLLING A SPEECH CONNECTION

TECHNICAL FIELD

The present invention relates to operator assisted switching of information and establishment of connections by telephone, and relates to the equipment and circuitry of an operator position.

BACKGROUND OF THE INVENTION

The purpose of an operator position is to receive telephone calls and to be able to provide the caller with the information requested and/or to switch it on. For example, operators of telephone networks usually offer various services, in particular information about subscriber lines, charges, etc., which are reached by dialling special numbers. Positions in information centers such as these are connected to exchanges equipped with modules for operator assisted services. Such exchanges are referred to below as operator service exchanges (OSX)—in Swiss Telecom PTT, for example, they are called integrated (special) service exchanges (Integrierte Dienstzentrale, IDZ). They are equipped with a personal computer (PC) and a headset. Both of these communicate with the OSX by means of a position desk controller (PDC), which is a module belonging to the operator service exchange. The PC in a digital operator position (DOP) of this sort accesses the necessary information sources, whether these are stored in its local memory or in other computers to which it is connected in a local area network (LAN) or a wide area network (WAN).

This type of digital operator position is normally set up near an operator service exchange in multiple instances. The number of positions occupied is dependent on requirements, in other words, on the number of calls. However, this number can be difficult to estimate at times. Unexpected surges or slowdowns in the amount of traffic make it almost impossible for the network operator to adjust the number of operator positions in time. Bottleneck situations of this nature could be avoided if it were possible for the operators to be on-call at remote positions which they could reach quickly, for example positions in their homes. The equipment required for this, principally a PC and a headset, is not of great weight. However, difficulties arise regarding the connection to the position desk controller since the speech connection and the workplace computer need to be connected to the PDC at the same time. Modem or ISDN connections between computers are known from data exchange or remote control applications via the telephone network. However, the speech connection is switched by the OSX and terminates at the position desk controller.

DISCLOSURE OF INVENTION

The problem, therefore, arises of providing supplementary equipment by means of which an operator position can be remotely operated without reduction in its ease of use and without requiring modifications to existing equipment.

According to a first aspect of the present invention, a remote-controlled operator position associated with a position desk controller connected to both an operator service exchange and a local personal computer wherein the position desk controller is for switching a speech connection between the operator service exchange and the connection provided for this purpose on the position desk controller is characterized in that the local personal computer is connected to a telephone network through an ISDN connection, that an application program which enables the personal computer to be remote-controlled is running in the local personal computer, that a line for analog speech connection links the local personal computer to the position desk controller, and that the computer is provided with a means for allowing a connection to be established and terminated through the telephone network for switching through the speech connection.

In accord with a second aspect of the present invention, control of a position with a local personal computer and a voice connection to an operator service exchange is characterized in that a remote personal computer is connected to a telephone network through an ISDN connection to the local personal computer, that an application program for enabling the local personal computer to be remote-controlled is installed for running in the local personal computer, and that a speech connection to the operator service exchange is connected to the telephone network through an ISDN connection associated with the local personal computer.

According to a third aspect of the present invention, a method for the operation of a position having an associated local personal computer and a voice connection switched by a position desk controller to an operator service exchange is characterized in that the control of the position is remote-controlled from a remote position by connecting a remote personal computer associated with the remote position through a telephone line to the local personal computer which maintains a speech connection with both the remote operator position and the speech connection, whereby the local personal computer switches the speech connection between the operator service exchange and the remote operator position.

On the one hand the remote control of the local operator position is to incorporate the use of the local personal computer; on the other hand it has to receive and to hold the speech connection from the-calling subscriber. The present invention envisages a remote control system for a computer via the telephone network and a speech connection via the telephone network. The computer should be remote-controlled in such a way as to retain the standard (graphical) user interface with practically no time lag; even with an optimized application program for the remote control function, this requires a relatively high data transfer speed. For this reason, the local personal computer can be operated as an ISDN terminal in the telephone network. The speech connection from the caller through the operator service exchange is switched from the OSX to a special module, the position desk controller (PDC). Normally, the connection terminates in a headset plugged in at the PDC. The continuation of this speech connection to a remote position represents a major part of the problem. The speech connection of a call received by the local personal computer cannot be switched through the OSX and on to another subscriber terminal without making significant system modifications to the digital operator position. In theory, the extension provided for the headset on the position desk controller could be directly connected to the microphone/earphone connection of a subscriber set. This arrangement could be used in order to establish a fixed connection with the remote position through the telephone network. However, such a configuration suffers from the disadvantage that the subscriber set must be operated in order to establish the connection. Even if this could be arranged once before the start of work at the remote position, it is impractical if the connection is accidentally interrupted. The present invention therefore envisages a line for the speech connection between the position desk controller and the local personal computer, if necessary involving the intermediary of a hybrid circuit. In this manner, the computer is able to monitor the speech connection and can establish and break the connection on its own. It is advantageous not to set down a further telephone subscriber line, but to use a computer as an ISDN terminal adapter (TA). Thanks to the ISDN connection, the computer is able to route the speech connection through one ISDN channel and the computer remote control function through the other ISDN channel.

In a preferred embodiment, the connections are provided by means of an ISDN plug-in card for the personal computer, the former possessing both an S-bus connection and an a/b two-wire connection, and therefore being able to function as an ISDN terminal adapter (TA) at the same time.

The remote operator position is equipped with the same sort of personal computer as is the remote-controlled operator position. However, there is no need for additional software and hardware such as the application program for operating the position desk controller, storage media, and a connection to further computers. On the contrary, an ISDN connection to the telephone network and an active application program which enables a distant computer to be controlled through a telephone line are all that are required. In addition, there must be a speech connection to the telephone network. It is advantageous to likewise conduct the speech connection through the computer, thus enabling an automatic connection set-up. In a preferred embodiment, the same plug-in card is used for the remote personal computer as for the local personal computer. This arrangement provides beneficial effects in that the speech connection is switched through the computer and also that both ISDN channels are used for speech and computer data respectively. Furthermore, the line used with the hybrid circuit can be the same as is employed for connecting the local personal computer with the position desk controller being equipped with a microphone input and an earphone output for the speech connection; however, a headset is used in this case instead of the connection between the hybrid circuit and the position desk controller.

These and other objects, features and advantages of the present invention will become more apparent in light of the detailed description of a best mode embodiment thereof, as illustrated in the accompanying drawing.

BRIEF DESCRIPTION OF THE DRAWINGS

The sole FIGURE shows schematically a preferred embodiment of a remote-controlled operator position 1 and a remote operator position 2 which are connected together through the telephone network.

BEST MODE FOR CARRYING OUT THE INVENTION

A digital operator position (DOP), according to the present invention, can be made into a remote-controlled operator position 1. A DOP, also referred to as an operator position, is normally manned and connected to an operator service exchange (OSX) 3 through a position desk controller (PDC) 4, and essentially consists of a local personal computer (PC) 5 and a connection 6 to the PDC 4 for the speech connection switched from the OSX 3. The position 1 is a remotely-controlled operator position 1 that is remote-controlled from a remote position 2, the latter being connected to the former through a telephone line 7 and essentially consisting of a remote personal computer 8 and a connection for a speech connection which is shown in the figure in the form of the a/b two-wire line 12.

The calls coming from the OSX 3 are typically displayed at a digital operator position in a local interaction between the position desk controller 4 and the local PC 5, received after an operator input, whereupon, after corresponding conditioning in the PDC 4, the appropriate speech connection is switched to the connection 6 provided for this purpose to a headset for the local operator. The position desk controller 4 converts the digital telephonic signal into a standard analog signal for connecting a normal subscriber station to an a/b two-wire line or directly connecting a. headset to a four-wire line. It is usual for the connection 6 to the PDC 4 to consist of two two-wire lines, one each for the earphone and the microphone in a headset; i.e., the hybrid is normally contained in the PDC 4, whereby the position desk controller 4, as a module of the operator service exchange 3, is set up as a stand-alone unit at the local operator position 1 for connection to a headset and to the local personal computer 5. This arrangement is not obligatory, however; the PDC 4 can also be integrated in the OSX 3 and the connection 6 to the OSX for the speech connection can be an a/b two-wire line directly connecting the OSX and the PC. During the conversation, the operator operates the local personal computer 5 which is incorporated in a local area network (LAN) through a data connection 11, by means of which the operator can obtain the required information from local storage media (not illustrated) or from the data network.

According to the invention, a remote personal computer 8 at a remote position is used for the remote control of the local position 1. The screen display of the local PC 5 is transmitted to the screen of the remote PC 8 through the telephone line 7, as are the key commands from the latter to the former. Known remote control systems of that kind require both computers to run operative application programs which are adapted to each other, and the use of modems at the connection to the telephone line 7. An ISDN connection is used due to the transmission speed required. The figure therefore also shows a schematic representation of an ISDN plug-in card 13 in both personal computers. The ISDN plug-in card 13 is connected through the S-bus 14 to the network terminator (NT) of the integrated services digital network.

Remote control requires the speech connection to reach the remote position. In accordance with the present invention, this is achieved by means of a path or line 15 for an analog speech connection which connects the local personal computer 5 to the position desk controller 4. The speech connection is routed via connection 6 of the PDC 4 when the position desk controller 4 is used locally; such a line makes it possible to switch the speech connection further through the PC 5, and in particular from the PC 5 to the remote position through the telephone network. In its preferred embodiment, the computer end of this line 15 consists of an a/b two-wire line 12 which is connected to the microphone input 61 and the earphone output 62 of the position desk controller 4 by a hybrid circuit 16, whereby the a/b two-wire line 12 is routed to the connection provided for this purpose on the ISDN plug-in card 13. This arrangement offers the advantage of not requiring the equipment normally present at the local position to be modified in order to change over to remote control. The line between the PDC 4 and the PC 5 and the hybrid circuit it contains can be easily connected to the plug-and-socket devices which are present in any case. The speech connection is connected to the telephone network through the ISDN plug-in card 13 and the S-bus 14 using the second channel of the single ISDN connection which is required. This connection can remain permanently established; it is activated by the application program of the local personal computer 5. The local personal computer can be remote-controlled and the speech connection can be switched through as soon as the remote control application program is activated.

The remote operator position 2 needs a remote personal computer 8 running an active application program for the remote-controlling of a computer through the telephone line and an appropriate extension, as well as a speech connection. This connection can be provided through a separate public office line or through the network terminator of the ISDN extension and a terminal adapter (TA); it is advantageous to use a hybrid circuit and a headset instead of the standard analog subscriber set. Theoretically, it is also possible to route the connection through the network terminator and an ISDN terminal. However, the cooperation of the operator is required in each of these cases in order to establish the connection. For this reason, a preferred embodiment in this instance also involves using the same ISDN plug-in card 13 in the remote PC 8 as is used in the local personal computer 5. It has an integral connection for an a/b two-wire line 12, i.e.,the ISDN plug-in card 13 incorporates the terminal adapter for the subscriber set which can be connected to the a/b two-wire line 12. This arrangement makes it possible to control the establishment, monitoring and termination of the connection by means of the computer 8, even from the remote end. As a result, a simple hybrid circuit identical to the hybrid circuit 16 in the remote-controlled operator position 1, and a headset connected to it can be used instead of the subscriber set.

The local operator position 1 can be fully remote-controlled provided the connection at the local operator position 1 between the position desk controller 4 and the computer 5 has been established through line 15, and provided the computer 5 is running the application program for enabling remote control through a telephone line. In order to achieve this, the operator at the remote position 2 initially establishes the telephone connection from his personal computer 8 to the personal computer at the local position 1, thereby gaining control over the local personal computer 5. Following this, the programs running in both computers cause them to establish and maintain the speech connection to a second number of the ISDN connection at the remote position 2. Furthermore, the local computer 5 ensures that the signals on line 15 are switched through to this newly created connection. In turn, the remote computer 8 switches this new connection to the outgoing a/b two-wire connection 12 which is connected to a hybrid circuit 16a and a headset in turn connected to the hybrid circuit 16a by an earphone lead 6a2 and a microphone lead 6a1 of a set of leads 6a.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Operator position (1), having a local personal computer (5) connected to a position desk controller (4) which is in turn connected to an operator service exchange (3), for controlling a speech connection between the operator service exchange (3) and a connection (6) provided for a headset for the position desk controller (4), wherein (A) the local personal computer (5) is connected to a telephone network through an ISDN connection, (B) an application program for enabling the local personal computer (5) to be remote-controlled is installed for execution in the local personal computer (5), (C) a line (15) for transmitting the speech connection in analog form is provided for linking the local personal computer (5) to the position desk controller (4), and (D) the local personal computer (5) is provided with a means for establishing and terminating a connection through the telephone network for connecting the speech connection thereto.

2. Operator position as claimed in claim 1 with the position desk controller (4) having a microphone input (61) and an earphone output (62) for the speech connection, characterized in that a section of the line (15) for analog speech connection and connected to the local personal computer comprises an a/b two-wire line (12) which is connected to the microphone input (61) and the earphone output (62) of the position desk controller (4) by a hybrid circuit (16).

3. Operator position as claimed in claim 1, characterized in that the ISDN connection to the computer is implemented by a plug-in card (13) for the personal computer (5), which has both an S-bus connection and an a/b two-wire connection.

4. Operator position, comprising: (A) a remote operator position (2) comprising a remote personal computer (8) for the remote-control of a local operator position (1), the local operator position (1) being connected to a position desk controller (4) which is in turn connected to an operator service exchange (3), the local operator position (1) having a local personal computer (5), and an ISDN connection to a telephone network which is connected by means of a line (15) for transmitting a speech connection in analog form to the position desk controller (4), for controlling a speech connection between the operator service exchange (3) and the connection provided for a headset for the position desk controller (4), and (B) an ISDN connection for connecting the remote personal computer (8) to a telephone network, and (C) an application program for enabling the local personal computer (5) to be remote-controlled is installed for running in the local personal computer (5) and (D) an application program for enabling the remote personal computer (8) to remote-control is installed in the remote personal computer (8).

5. Operator position as claimed in claim 4, wherein the ISDN connections for both the local and remote personal computers are implemented by plug-in cards (13) which each have both an S-bus connection and an a/b two-wire connection.

6. Operator position as claimed in claim 5, wherein the speech connection is connected to the telephone network through the a/b two-wire line connection on the plug-in card (13).

7. Operator position as claimed in claim 6, wherein a hybrid circuit is connected to each a/b two-wire line connection and the hybrid circuit has a microphone input and an earphone output to which a headset can be connected at the remote operator position.

8. Method for the operation of an operator position (1) connected to an operator position desk controller (4) connected in turn to an operator service exchange (3), the operator position (1) having a local personal computer (5) connected to the position desk controller (4) for controlling a speech connection between the operator service exchange (3) and the speech connection on the position desk controller (4) comprising the steps of (A) operating the operator position (1) with a remote operator position (2) by remotely controlling operation of the operator position (1) wherein the local personal computer (5) is remote-controlled by a remote personal computer (8) at the remote operator position through a telephone line (7), (B) duplicating a display on the local personal computer (5) on the remote personal computer (8) through the telephone line (7), (C) maintaining via the local personal computer (5) a speech connection with the remote operator position (2) through the telephone line (7) by putting the speech connection through to a line (15) which connects the local personal computer (5) to the position desk controller (4), and (D) switching the speech connection via the local personal computer (5) between the operator service exchange (3) and the remote operator position (2).

9. Method as claimed in claim 8 with the operator position (1) controlled remotely, wherein an ISDN connection to the local personal computer is implemented by a plug-in card (13) which has both an S-bus connection and an a/b two-wire connection and a remote operator position wherein an ISDN connection is similarly implemented by a plug-in card (13) for the remote personal computer (8) which has both an S-bus connection and an a/b two-wire connection, and wherein the speech connection and the telephone connection for the step of remotely-controlling operation of the operator position is established through the two channels of a single ISDN connection.

* * * * *